United States Patent
Heo et al.

(10) Patent No.: US 10,548,098 B2
(45) Date of Patent: *Jan. 28, 2020

(54) REPORTING POWER HEADROOM FOR AGGREGATED CARRIERS

(71) Applicant: BlackBerry Limited, Waterloo (CA)

(72) Inventors: Youn Hyoung Heo, San Jose, CA (US); Zhijun Cai, Ashburn, VA (US); Andrew Mark Earnshaw, Kanata (CA); Sean Michael McBeath, Keller, TX (US); Mo-Han Fong, Sunnyvale, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 68 days.

This patent is subject to a terminal disclaimer.

(21) Appl. No.: 15/901,663

(22) Filed: Feb. 21, 2018

(65) Prior Publication Data

US 2018/0184386 A1 Jun. 28, 2018

Related U.S. Application Data

(63) Continuation of application No. 15/011,089, filed on Jan. 29, 2016, now Pat. No. 9,936,467, which is a (Continued)

(51) Int. Cl.
*H04W 52/36* (2009.01)
*H04W 52/34* (2009.01)
(Continued)

(52) U.S. Cl.
CPC ......... *H04W 52/365* (2013.01); *H04L 5/0053* (2013.01); *H04W 52/242* (2013.01);
(Continued)

(58) Field of Classification Search
None
See application file for complete search history.

(56) References Cited

U.S. PATENT DOCUMENTS 8,019,373 B2 9/2011 Cho et al.
8,145,271 B2 3/2012 Ishii
(Continued)

FOREIGN PATENT DOCUMENTS

CN 101340711 A 1/2009
EP 2317815 A1 5/2011
(Continued)

OTHER PUBLICATIONS

Canadian Office Action; Application No. 2,972,529; dated May 4, 2018; 4 pages.
(Continued)

*Primary Examiner* — Alex Skripnikov
(74) *Attorney, Agent, or Firm* — Conley Rose, P.C.; J. Robert Brown, Jr.; Albert A. Abbou

(57) ABSTRACT

A method for reporting power headroom-related information for a plurality of aggregated carriers. The method includes reporting in a bitmap the power headroom-related information for a number of the aggregated carriers that is less than or equal to the total number of aggregated carriers, wherein the power headroom-related information is one of a power headroom for at least one of the aggregated carriers and a path loss for at least one of the aggregated carriers.

20 Claims, 10 Drawing Sheets

Related U.S. Application Data continuation of application No. 14/261,206, filed on Apr. 24, 2014, now Pat. No. 9,252,935, which is a continuation of application No. 13/689,020, filed on Nov. 29, 2012, now Pat. No. 8,744,341, which is a continuation of application No. 12/785,323, filed on May 21, 2010, now Pat. No. 8,351,359.

(60) Provisional application No. 61/320,211, filed on Apr. 1, 2010, provisional application No. 61/303,920, filed on Feb. 12, 2010, provisional application No. 61/180,652, filed on May 22, 2009.

(51) Int. Cl.
| | | |
|---|---|---|
| *H04W 76/10* | (2018.01) | |
| *H04W 72/12* | (2009.01) | |
| *H04W 72/04* | (2009.01) | |
| *H04L 5/00* | (2006.01) | |
| *H04W 52/24* | (2009.01) | |

(52) U.S. Cl.
CPC ....... *H04W 52/34* (2013.01); *H04W 72/0406* (2013.01); *H04W 72/1284* (2013.01); *H04W 76/10* (2018.02)

(56) References Cited

U.S. PATENT DOCUMENTS

| | | |
|---|---|---|
| 8,249,091 B2 | 8/2012 | Kim et al. |
| 8,351,359 B2 | 1/2013 | Heo et al. |
| 8,351,974 B2 | 1/2013 | Ahn et al. |
| 8,626,225 B2 | 1/2014 | Heo et al. |
| 8,744,341 B2 | 6/2014 | Heo et al. |
| 8,855,061 B2 | 10/2014 | Heo et al. |
| 9,252,935 B2 | 2/2016 | Heo et al. |
| 9,936,467 B2 | 4/2018 | Heo et al. |
| 2006/0013182 A1 | 1/2006 | Balasubramanian et al. |
| 2007/0248046 A1 | 10/2007 | Khan |
| 2008/0159211 A1 | 7/2008 | Kwon et al. |
| 2008/0159428 A1 | 7/2008 | Shinozaki |
| 2008/0227476 A1 | 9/2008 | Cho et al. |
| 2009/0061778 A1 | 3/2009 | Vrzic et al. |
| 2009/0092055 A1 | 4/2009 | Balasubramanian et al. |
| 2009/0238293 A1 | 9/2009 | Bhatti et al. |
| 2010/0034174 A1 | 2/2010 | Nishikawa et al. |
| 2010/0110895 A1 | 5/2010 | Wu |
| 2010/0158147 A1 | 6/2010 | Zhang et al. |
| 2010/0173665 A1 | 7/2010 | Michel et al. |
| 2010/0202393 A1 | 8/2010 | Zhang et al. |
| 2010/0232385 A1 | 9/2010 | Hsu |
| 2010/0238863 A1 | 9/2010 | Guo et al. |
| 2010/0272091 A1 | 10/2010 | Fabien et al. |
| 2010/0273515 A1 | 10/2010 | Fabien et al. |
| 2011/0019625 A1 | 1/2011 | Zhang et al. |
| 2011/0110315 A1 | 5/2011 | Chen et al. |
| 2011/0141928 A1 | 6/2011 | Shin et al. |
| 2011/0310760 A1 | 12/2011 | Wu et al. |
| 2013/0188570 A1 | 7/2013 | Zhao et al. |
| 2013/0250925 A1 | 9/2013 | Lohr et al. |

FOREIGN PATENT DOCUMENTS

| | | | |
|---|---|---|---|
| EP | 2526711 A1 | 11/2012 | |
| WO | 2006019441 A1 | 2/2006 | |
| WO | 2008155469 A1 | 12/2008 | |

OTHER PUBLICATIONS

*Nokia Solutions and Networks Oy* v. *BlackBerry Limited*; Nullity Action; Patent in Suit: EP 2 945 440; Jul. 3, 2018; 28 pages.
*BlackBerry Limited* v. *Nokia Solutions and Networks GmbH & Co. KG*; Patent in Suit: EP 2 945 440; Statement of Defense; Jul. 4, 2018; 26 pages.

3GPP TS 36323 V8.5.0; 3rd Generation Partnership Project; Technical Specification Group Radio Access Network; Evolved Universal Terrestrial Radio Access (E-UTRA), Packet Data Convergence Protocol (PDCP) Specification; Release 8; Mar. 2009; 24 pages.
European Examination Report; Application No. 181822715; dated Jun. 14, 2019; 4 pages.
3GPP TS 25321 v7.5.0; 3rd Generation Partnership Project; Technical Specification Group Radio Access Network; Medium Access Control (MAC) Protocol Specification; Release 7; Jun. 2007; 141 pgs.
3GPP TS 36.211 v8.6.0; 3rd Generation Partnership Project; Technical Specification Group Radio Access Network; Evolved Universal Terrestrial Radio Access (E-UTRA); Physical Channels and Modulation; Release 8; Mar. 2009; 83 pgs.
3GPP TR 25.942 v8.0.0; 3rd Generation Partnership Project; Technical Specification Group Radio Access Networks; Radio Frequency (RF) System Scenarios; Release 8; Dec. 2008; 135 pgs.
3GPP TS 36321 v8.5.0; 3rd Generation Partnership Project; Technical Specification Group Radio Access Network; Evolved Universal Terrestrial Radio Access (E-UTRA); Medium Access Control (MAC) Protocol Specification; Release 3; Mar. 2009; 46 pgs.
3GPP TS 36.213 v8.6.0; 3rd Generation Partnership Project; Technical Specification Group Radio Access Network; Evolved Universal Terrestrial Radio Access (E-UTRA); Physical Layer Procedures; Release 8; Mar. 2009; 77 pgs.
3GPP TS 44.018 V8.2.0; 3rd Generation Partnership Project; Technical Specification Group GSM/EDGE Rado Access Network; Mobile Radio Interface Layer 3 Specification; Radio Resource Control (RRC) Protocol; Release 8; Mar. 2008; 399 pages.
Samsung; 3GPP TSG RAN WG1 #56bis; Title: "UL Transmission Power Control in LTE-A;" R1-091250; Seoul, Korea; Mar. 23-27, 2009; 5 pgs.
Qualcomm Europe; 3GPP TSG RAN WG2 #65bis; Title: "DC-HSUPA Impact on RAN2 Specifications;" R2-092156; Seoul, South Korea; Mar. 23-27; 9 pgs.
Nokia Siemens Networks, Nokia; 3GPP TSG RAN WG1 #56 Meeting; Title: "PUSCH Power Control for LTE-Advanced;" R1-090738; Athens, Greece; Feb. 9-13, 2009; 4 pgs.
Research in Motion UK Limited; 3GPP TSG RAN WG1 Meeting #59bis; Title: "Remaining Issues on Uplink Power Control for Carrier Aggregation;" R1-100569; Valencia, Spain; Jan. 18-22, 2010; 4 pgs.
3GPP TSG RAN WG1 #56-BIS Meeting; "PUSCH Power Control for LTE-Advanced"; R1-091372; Seoul, Korea; Mar. 23-27, 2009; 4 pages.
Office Action dated Jun. 29, 2012; U.S. Appl. No. 12/785,320, filed May 21, 2010; 33 pages.
Final Office Action dated Feb. 11, 2013; U.S. Appl. No. 12/785,320, filed May 21, 2010; 40 pages.
Office Action dated May 22, 2013; U.S. Appl. No. 12/785,320, filed May 21, 2010; 23 pages.
Notice of Allowance dated Aug. 21, 2013; U.S. Appl. No. 12/785,320, filed May 21, 2010; 14 pages.
Office Action dated Jul. 20, 2012; U.S. Appl. No. 12/785,323, filed May 21, 2010; 23 pages.
Notice of Allowance dated Nov. 14, 2012; U.S. Appl. No. 12/785,323, filed May 21, 2010; 12 pages.
Office Action dated Nov. 9, 2012; U.S. Appl. No. 12/785,325, filed May 21, 2010; 48 pages.
Final Office Action dated Jun. 7, 2013; U.S. Appl. No. 12/785,325, filed May 21, 2010; 45 pages.
Advisory Action dated Aug. 29, 2013; U.S. Appl. No. 12/785,325, filed May 21, 2010; 3 pages.
Office Action dated Sep. 12, 2013; U.S. Appl. No. 12/785,325, filed May 21, 2010; 27 pages.
Final Office Action dated Mar. 7, 2014; U.S. Appl. No. 12/785,325, filed May 21, 2010; 36 pages.
Notice of Allowance dated May 23, 2014; U.S. Appl. No. 12/785,325, filed May 21, 2010; 15 pages.
Office Action dated Dec. 20, 2013; U.S. Appl. No. 13/689,020, filed Nov. 29, 2012; 26 pages.
Notice of Allowance dated Mar. 31, 2014; U.S. Appl. No. 13/689,020, filed Nov. 29, 2012; 13 pages.

(56) References Cited

OTHER PUBLICATIONS

Office Action dated Mar. 25, 2015; U.S. Appl. No. 14/261,206, filed Apr. 24, 2014; 34 pages.
Final Office Action dated Jul. 21, 2015; U.S. Appl. No. 14/261,206, filed Apr. 24, 2014; 13 pages.
Notice of Allowance dated Oct. 8, 2015; U.S. Appl. No. 14/261,206, filed Apr. 24, 2014; 5 pages.
Office Action dated Jun. 16, 2016; U.S. Appl. No. 15/011,089, filed Jan. 29, 2016; 19 pages.
Final Office Action dated Jan. 23, 2017; U.S. Appl. No. 15/011,089, filed Jan. 29, 2016; 7 pages.
Advisory Action dated Apr. 13, 2017; U.S. Appl. No. 15/011,089, filed Jan. 29, 2016; 9 pages.
Advisory Action dated Jul. 25, 2017; U.S. Appl. No. 15/011,089, filed Jan. 29, 2016; 3 pages.
Dffice Action dated Aug. 29, 2017; U.S. Appl. No. 15/011,089, filed Jan. 29, 2016; 11 pages.
Notice of Allowance dated Feb. 12, 2018; U.S. Appl. No. 15/011,089, filed Jan. 29, 2016; 9 pages.
PCT International Search Report; PCT Application No. PCT/US2010/035844; dated Nov. 12, 2010; 8 pgs.
PCT Written Opinion of the International Searching Authority; PCT Application No. PCT/US2010/035844; dated Nov. 12, 2010; 14 pgs.
PCT Written Opinion of the International Preliminary Examining Authority; PCT Application No. PCT/US2010/035844; dated May 25, 2011; 4 pgs.
PCT International Preliminary Report on Patentability; PCT Application No. PCT/US2010/035844; dated Aug. 24, 2011; 22 pgs.
Canadian Office Action; Application No. 2,763,448; dated Oct. 4, 2013; 3 pages.
Canadian Office Action; Application No. 2,763,448; dated Dec. 15, 2014; 4 pages.
PCT International Search Report; PCT Application No. PCT/US2010/035845; dated Nov. 12, 2010; 7 pgs.
PCT Written Opinion of the International Searching Authority; PCT Application No. PCT/US2010/035845; dated Nov. 12, 2010; 14 pgs.
PCT International Preliminary Report on Patentability; PCT Application No. PCT/US2010/035845; dated Jun. 1, 2011; 17 pgs.
Canadian Office Action; Application No. 2,763,048; dated Oct. 4, 2013; 3 pages.
Canadian Office Action; Application No. 2,763,048; dated Feb. 3, 2015; 3 pages.
Canadian Office Action; Application No. 2,763,048; dated Jan. 22, 2016; 4 pages.
European Extended Search Report; Application No. 13151125.5; dated Sep. 9, 2014; 6 pages.
European Extended Search Report; Application No. 15172887.0; dated Oct. 2, 2015; 7 pages.
European Extended Search Report; Application No. 17158544.1; dated Jul. 27, 2017; 8 pages.
PCT International Search Report; PCT Application No. PCT/US2010/035846; dated Nov. 12, 2010; 7 pgs.
European Extended Search Report; Application No. 18182273.5 dated Aug. 10, 2018; 10 pages.
PCT Written Opinion of the International Searching Authority; PCT Application No. PCT/US2010/035846; dated Nov. 12, 2010; 11 pgs.
PCT International Preliminary Report on Patentability; PCT Application No. PCT/US2010/035846; dated May 25, 2011; 17 pgs.
Canadian Office Action; Application No. 2,763,195; dated Oct. 1, 2013; 3 pages.
Canadian Office Action; Application No. 2,763,195; dated Nov. 24, 2014; 3 pages.
Canadian Office Action; Application No. 2,763,195; dated Jan. 18, 2016; 4 pages.
Canadian Office Action; Application No. 2,763,195; dated Nov. 15, 2016; 4 pages.
European Examination Report; Application No. 10730883.5; dated Sep. 6, 2012; 3 pages.
European Examination Report; Application No. 10730883.5; dated Feb. 11, 2013; 3 pages.

| $d_k(n)$ | $\delta_k(n)$ |
|---|---|
| 00 | -3 dB |
| 01 | -1 dB |
| 10 | +1 dB |
| 11 | +3 dB |

| Carrier | Path loss + Power control correction at time n - 1 | Path loss + Power control correction at time n | Delta value on same carrier from n – 1 to n | Delta relative to reference carrier's delta |
|---|---|---|---|---|
| Reference carrier | - 100 dB | - 110 dB | - 10 dB | n/a |
| 1 | - 99 dB | - 108 dB | - 9 dB | + 1 dB |
| 2 | - 101 dB | - 112 dB | - 11 dB | - 1 dB |
| 3 | - 100 dB | - 111 dB | - 11 dB | - 1 dB |
| 4 | - 104 dB | - 114 dB | - 10 dB | 0 dB |

Figure 8

| | | | | | | | |
|---|---|---|---|---|---|---|---|

910 →

| BITMAP (10011) | | | PH1 | | Oct 1 |
|---|---|---|---|---|---|
| PH1 | | PH4 | | | Oct 2 |
| PH 4 | PH5 | | | R | Oct 3 |

| | | | | | | | |
|---|---|---|---|---|---|---|---|

1020

| | | | |
|---|---|---|---|
| 1010 → | Number of PH values | PH for signaling carrier | Oct 1  1040ₐ |
| 1030ₐ → | Carrier index 1 | PH for indexed carrier 1 | Oct 2  1040_b |
| 1030_b → | Carrier index 2 | PH for indexed carrier 2 | Oct 3 |

REPORTING POWER HEADROOM FOR AGGREGATED CARRIERS

CROSS-REFERENCE TO RELATED APPLICATIONS

This application is a continuation of U.S. patent application Ser. No. 15/011,089, filed Jan. 29, 2016 by Youn Hyoung Heo, et al., entitled "Reporting Power Headroom for Aggregated Carriers" which is a continuation of U.S. Pat. No. 9,252,935 issued on Feb. 2, 2016 entitled, "Reporting Power Headroom for Aggregated Carriers" Ser. No. 14/261206 which is a continuation of U.S. Pat. No. 8,744,341 issued on Jun. 3, 2014 entitled "Reporting Power Headroom for Aggregated Carriers" Ser. No. 13/689020 which is a continuation of U.S. Pat. No. 8,351,359, issued on Jan. 8, 2013 entitled "Reporting Power Headroom for Aggregated Carriers" Ser. No. 12/785323 , which claims priority to U.S. Provisional Application No. 61/180,652, filed May 22, 2009 by Youn Hyoung Heo, et al., entitled "Power Headroom Reporting For Carrier Aggregation"; U.S. Provisional Application No. 61/303,920, filed Feb. 12, 2010 by Youn Hyoung Heo, et al., entitled "Power Headroom Reporting For Carrier Aggregation"; and U.S. Provisional Application No. 61/320,211, filed Apr. 1, 2010 by Youn Hyoung Heo, et al., entitled "Power Headroom Reporting For Carrier Aggregation", all of which are incorporated herein by reference as if reproduced their entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. As used herein, the term "access node" will refer to any component of a wireless telecommunications system, such as a traditional base station, a wireless access point, or an LTE eNB, that creates a geographical area of reception and transmission coverage allowing a UA to access other components in the system. An access node may comprise a plurality of hardware and software.

LTE was standardized in Release 8 of the wireless telecommunications standards promoted by the 3rd Generation Partnership Project (3GPP). 3GPP Release 10 standards deal with LTE-Advanced or LTE-A technology. Under LTE-A, relays and other advanced components might be included in a wireless telecommunications network. A relay is a component in a wireless network that is configured to extend or enhance the coverage created by an access node or another relay. Although access nodes and relays may be distinct components with different capabilities and functions, for ease of reference, the term "access node" will be used herein to refer to either a relay or an access node as described above.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 is a table illustrating a calculation of a power difference between a carrier and a reference carrier according to an embodiment of the disclosure.

FIG. 9 is a diagram of a control element that could be used for transmitting power headroom-related information according to an alternative embodiment of the disclosure.

FIG. 10 is a diagram of a control element that could be used for transmitting power headroom-related information according to an alternative embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
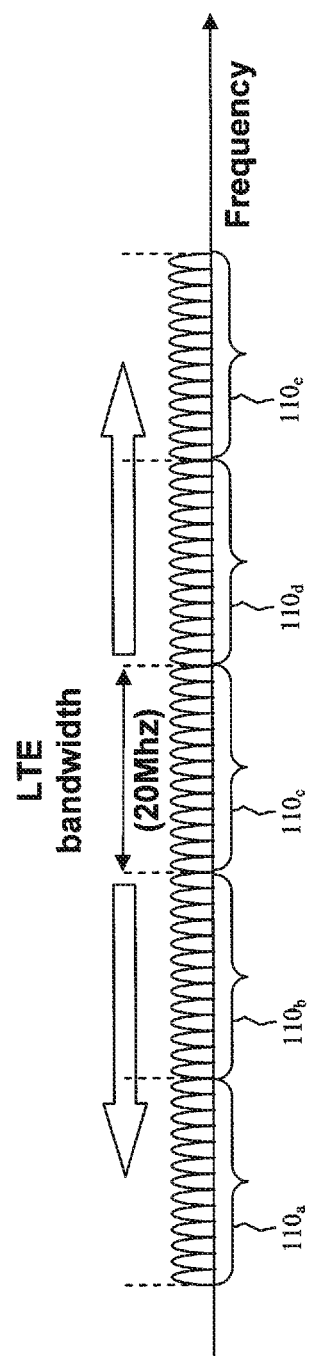
FIG. 1 illustrates an aggregation of carriers.

In LTE-A, carrier aggregation might be used in order to support wider transmission bandwidths and hence increase the potential peak data rate to meet LTE-A requirements. In carrier aggregation, multiple component carriers are aggregated and can be allocated in a subframe to a UA as shown in FIG. 1. In this example, each component carrier 110 has a width of 20 MHz and the total system bandwidth becomes 100 MHz. The UA may receive or transmit on a multiple of up to five component carriers depending on its capabilities. In addition, depending on the deployment scenario, carrier aggregation may occur with carriers located in the same band and/or carriers located in different bands. For example, one carrier may be located at 2 GHz and a second aggregated carrier may be located at 800 MHz.

Figure 2:
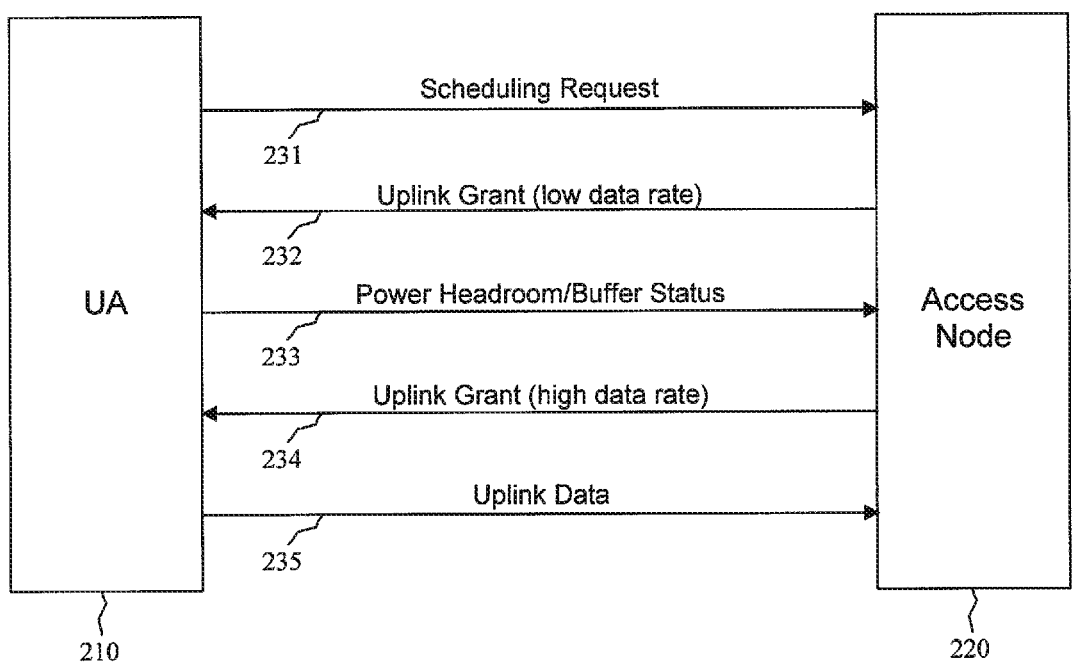
FIG. 2 illustrates a procedure by which an access node grants a resource to a user agent.

In uplink transmissions, a UA transmits a power headroom report (PHR) and a buffer status report (BSR) to an access node in order to assist with uplink scheduling. The access node uses this information when it determines the amount of frequency resources and proper modulation and coding scheme (MCS) level for physical uplink shared channel (PUSCH) transmissions. FIG. 2 shows the general flow of an uplink transmission from a UA 210 to an access node 220. When new data arrives at the UA buffer, the UA 210, at event 231, transmits a scheduling request on the physical uplink control channel (PUCCH) if there is no uplink PUSCH resource available for the initial transmission. Since the access node 220 does not know the current uplink channel conditions or the amount of pending data, the access node 220 schedules a small amount of uplink resources, as shown at event 232. The UA 210, at event 233, then transmits a PHR and BSR using this initial uplink resource. With this additional information, the access node 220, at event 234, can provide the UA 210 with a larger amount of uplink resources. At event 235, the UA 210 transmits to the access node 220 at a higher data rate according to the UA buffer status and the observed channel conditions.

Figure 3:
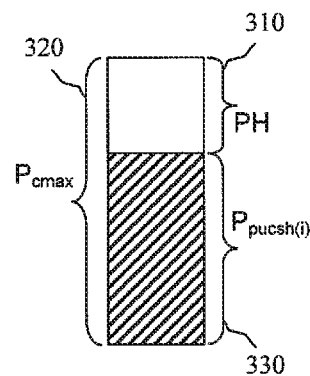
FIG. 3 is a diagram of a power headroom and related quantities.

As shown in FIG. 3, the power headroom (PH) 310 is defined as the difference between the nominal UA maximum transmit power ($P_{cmax}$) 320 and the estimated power for PUSCH transmissions ($P_{pusch(i)}$) 330. Even when the same data rate is transmitted in two different situations, the PH values can be different depending on the current UA channel conditions. From the access node scheduler's point of view, a large PH means that the UA has more room to increase its power to accommodate a higher data rate transmission, while a small PH means that the UA cannot increase its data rate.

The 3GPP Technical Specification (TS) 36.213, which is incorporated herein by reference for all purposes, defines the following equation which a UA can use to calculate the PH:

$$PH(i) = P_{CMAX} - P_{PUSCH}(i)$$
$$= P_{CMAX} - \left\{ \begin{array}{c} 10\log_{10}(M_{PUSCH}(i)) + P_{O\_PUSCH}(j) + \\ \alpha(j) \cdot PL + \Delta_{TF}(i) + f(i) \end{array} \right\}$$

This equation means that the PH is the remaining available transmission power, obtained by subtracting the uplink transmission power at the ith subframe from the maximum allowable transmission power. The parameters are defined as follows.

$P_{CMAX}$ is the configured maximum UA transmission power.

$M_{PUSCH(i)}$ is the bandwidth of the PUSCH resource assignment expressed in number of resource blocks scheduled for subframe i.

$P_{O\_PUSCH}(j)$ is a parameter composed of the sum of a cell-specific nominal component and a UA-specific component provided by higher layers.

$\alpha(j)$ is defined in 3GPP TS 36.213.

PL is the downlink path loss estimate calculated in the UA in dB.

$\Delta_{TF}$ (I) is the offset with respect to the transport format.

f (i) is the power control adjustment.

In LTE-A systems, UAs might report their PH to an access node to assist with uplink scheduling as in the case with LTE systems. However, the PH reporting approach used in LTE, where PH is the difference between the maximum allowable and current uplink transmission powers, may not be appropriate in LTE-A. An LTE-A UA is able to transmit using multiple carriers simultaneously, and scheduling might be performed on a per-carrier basis with different MCS levels. If each carrier is constrained to use the same uplink transmit power, one PH report may be sufficient. However, the uplink transmit power would be expected to be different for each carrier because some power-related parameters might vary for different carriers.

For example, the path loss can be different if the carriers are located in different bands. Assuming two example carriers are located at 2 GHz and 800 MHz, respectively, the expected statistical difference in path loss can be calculated as a function of the frequency based on the path loss model in 3GPP Technical Report (TR) 25.942. In this model, the path loss L is given as $40(1-4\times10^{-3} \text{ Dhb})\text{Log}_{10}(R)-18 \text{ Log}_{10}(\text{Dhb})+21 \text{ Log}_{10}(f)+80$ dB, where f is the frequency in MHz, Dhb is the access node antenna height in meters (in 3GPP, 15 m is assumed), and R is the distance between the access node and the UA in kilometers. For 2 GHz, $L=128.1+37.6 \text{ Log}_{10}(R)$. For 800 MHz, $L=119.7+37.6 \text{ Log}_{10}(R)$. So, provided that there are no other factors, the expected mean difference in path loss between 2 GHz and 800 MHz will be about 9 dB. It is noted that this difference has been calculated with a statistical model. In an actual deployment, it would be not be realistic for an access node to be able to accurately predict the path loss difference between bands due to different propagation characteristics as a function of the frequency. For example, higher frequency carriers generally attenuate faster as a function of distance and are also more likely to be attenuated by environmental factors such as building penetration, foliage, rain, etc.

Also, the power control adjustment, f(i), might be different for different carriers. An access node could transmit individual TPC (Transmit Power Control) commands per carrier or a single combined TPC command for all of the carriers. Even though the access node originates the TPC commands, it would be difficult for the access node to correctly track the current f(i) values per carrier due to possible TPC signaling errors and/or TPC signals that were mis-detected by the UA.

In addition, $P_{O\_PUSCH}$ might vary for different carriers. $P_{O\_PUSCH}$ is a cell- and UA-specific parameter that adjusts the target signal to interference-plus-noise ratio (SINR) based on the interference level. Since each component carrier is scheduled independently, each carrier might experience a different inter-cell interference level. The loading of different carriers may be different depending on the scheduling in the neighbor cells. For example, the access node might schedule cell-edge UAs on one carrier and more centrally-located UAs on the remaining carriers. In addition, the network topology may result in different neighboring cells having different carriers available. For instance, one cell may have five carriers in total, but a neighboring cell that is expected to be less lightly loaded may only be configured with a maximum of three carriers.

Also, α(j) might be different for different carriers. α(j) is a cell-specific parameter intended to improve cell throughput under small interference levels. This parameter can be varied based on the cell loading and/or on the UA distribution within a cell.

For these and other reasons, the uplink transmit power, and therefore the power headroom, might be different for each carrier in a set of aggregated carriers. To reflect the need for individual PH values per carrier or per band, the PH of all carriers could be reported to the access node. However, this could result in excessive signaling overhead, since it may not be necessary to report the PH for every carrier. In an embodiment, various schemes are provided for efficiently transmitting per-carrier PH values for a set of aggregated carriers in order to reduce signaling overhead.

Most of the factors determining a PH value are carrier-specific but, other than path loss (and possibly the current power control correction), the access node is typically aware of these parameters. Therefore, if the access node is made aware of the path loss for each carrier, the access node can calculate a PH for each carrier. A UA could report an observed path loss in a higher-layer measurement report, but such a report may not be sent frequently enough because higher-layer messages tend to be larger and generally incur some delay before being triggered. Consequently, it may be advantageous for the UA to report a separate PH value to the access node for each carrier. However, it may be unnecessary to report separate PH values for all carriers given that the path losses of carriers located in the same frequency band are typically similar.

In an embodiment, to avoid additional signaling overhead, the number of carriers for which the PH or PH-related information is reported is less than or equal to the total number of configured carriers. For notational convenience, a carrier for which a PH or PH-related information is reported is referred to herein as a "reporting carrier". In an embodiment, there are two approaches to configure which carriers are reporting carriers.

In one embodiment, a UA determines which carriers are reporting carriers based on whether the carriers are located in the same band or not. If a PH report has been triggered by one of the triggering criteria described below, and if there are multiple carriers in the same band, the UA can select the reporting carrier using a predefined set of rules known by both the access node and UA. For example, the UA might choose the carrier having the lowest centre frequency, the carrier having the lowest physical cell ID, or some other carrier or carriers. Since the access node already knows whether or not the configured carriers are located in the same band, the UA does not have to signal its decision to the access node. The access node is aware of this predefined rule and can utilize the PH reporting correctly.

In another embodiment, an access node configures the carrier set to be reported. The access node selects the carriers for which PH reporting will be performed and communicates this decision to the UA via radio resource control (RRC) signaling or media access control (MAC) control elements. This approach provides additional freedom to the access node because the access node can select the reporting carriers regardless of whether those carriers are located in the same or different bands. One approach would involve the access node using a bitmap to indicate which carriers' PHs should be reported, although other methods could also be used.

In LTE, a PH report might be transmitted at periodic intervals and/or when a triggering event occurs. According to 3GPP TS 36.321, a PH report is triggered if any of the following events occur: the prohibitPHR-Timer expires or has expired and the path loss has changed more than dl-PathlossChange dB since the last power headroom report, when the UA has uplink resources for a new transmission; the periodicPHR-Timer expires, in which case the PHR is referred to as a "Periodic PHR"; upon configuration and reconfiguration of a Periodic PHR.

In an embodiment, these criteria are expanded to support carrier aggregation under LTE-A. The triggers related to the expiration of the periodicPHR-Timer and the configuration and reconfiguration of a Periodic PHR might remain the same, but the trigger related to the expiration of the prohibitPHR-Timer might be modified. More specifically, in LTE-A, a PH report is triggered if the prohibitPHR-Timer expires or has expired and the path loss of any reporting carrier has changed more than dl-PathlossChange dB since the last power headroom report, when the UA has uplink resources for a new transmission. The PH reporting scheme could be such that only reporting carriers that satisfy this dl-PathlossChange criterion actually report their new PH values. That is, not all configured reporting carriers would actually include their PH values in the PH report.

It has been discussed that the number of active carriers currently used by a UA can be configured semi-statically. In this case, when a new carrier is added to an aggregation of carriers, it may be desirable to report its PH as soon as possible to assist with uplink scheduling on that carrier. Therefore, in an embodiment, as one additional criterion for LTE-A PH reporting, a PH report is triggered when a UA receives a new carrier configuration from the access node and/or a new PH reporting configuration that includes a new reporting carrier.

As mentioned previously, a UA could transmit a PH report to an access node via RRC signaling or via MAC control elements. Since the RRC signaling approach might incur additional delay and signaling overhead, the MAC control element approach may be preferable. The following alternatives for transmitting a PH or PH-related information are based on the MAC control element approach. If there is no explicit indication otherwise, the PH reporting discussed in the following alternatives is triggered according to the criteria described above.

In one alternative, when PH reporting is triggered, a UA transmits the PHs for all of the reporting carriers. For example, if there are four reporting carriers, when the observed path loss difference for one of the reporting carriers exceeds the configured threshold (that is, the path loss of a reporting carrier has changed more than dl-PathlossChange dB), the UA transmits the PHs for all four of the reporting carriers.

Figure 4:
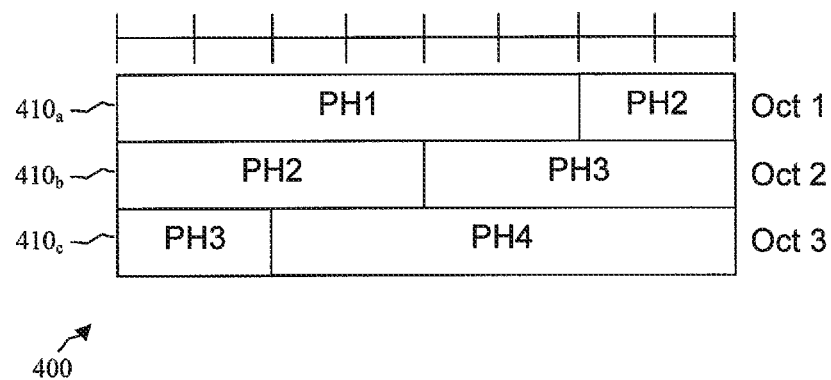
FIG. 4 is a diagram of a control element that could be used for transmitting power headroom-related information according to an embodiment of the disclosure.

FIG. 4 illustrates an example of a MAC control element 400 that could be used for transmitting the PHs of all reporting carriers. The control element 400 consists of three byte-aligned octets 410. The number of PH values equals the number of reporting carriers. In this example four reporting carriers have been configured. The length of the PH values is six bits, as in LTE. Each $PH_k$ represents the PH of carrier k. In some embodiments, if the allocated UL resources cannot accommodate the MAC control element of all PHs plus its subheader as a result of logical channel prioritization, then the UA can decide not to transmit all PHs or transmit PHs of a subset of carriers in the MAC control element to be accommodated in the allocated UL resources. The UA can select carriers based on the logical or physical carrier indexing. In one embodiment, the UA can select a carrier based on the priority of the carrier. For example, the UA can transmit the PH of the uplink anchor carrier or a carrier used to transmit data with a high quality of service (QoS).

In another alternative, a UA transmits a PH report in a long format or a short format depending on the situation. That is, to reduce signaling overhead, two different kinds of PH report can be defined: a wideband PH report and a per-carrier PH report. The wideband PH report represents the power situation across the system bandwidth and could be generated by averaging the PH values of all carriers, could include the PH of a certain representative carrier, or could represent the system-wide power in some other manner. This wideband PH report could be transmitted in a MAC control element, and the existing LTE format could be re-used because the wideband PH report includes only one PH value. For per-carrier PH reports, the PH of each carrier could be transmitted as described above.

When these two different PH reports are used, the PH reports could be configured using one of two different techniques. In one technique, different reporting periodicities are configured for each type of report, with the wideband PH being reported more often than the per-carrier PHs. For example, a wideband PH might be reported every 10 milliseconds, and per-carrier PHs might be reported every 100 milliseconds. In another technique, whenever a PH report is to be generated, the UA transmits per-carrier PH information if the PH difference between different reporting carriers or the difference between per carrier PHs and the wideband PH are larger than a preset threshold. Otherwise, the UA transmits a wideband PH report. This threshold could be configured by higher-layer signaling. When this second technique is used, the UA could indicate whether the PH report is of the wideband or per-carrier PH format by including a 1-bit indicator before the PH values.

Figure 5A:
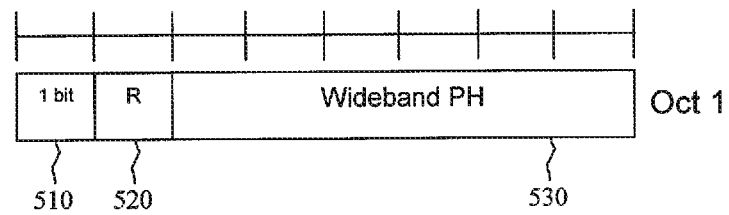
FIG. 5a is a diagram of a control element that could be used for transmitting power headroom-related information according to an alternative embodiment of the disclosure.
Figure 5B:
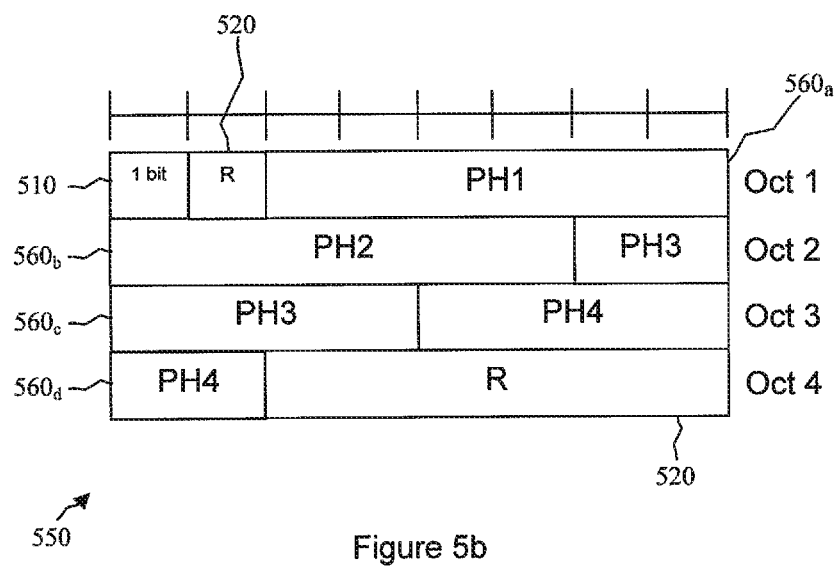
FIG. 5b is a diagram of a control element that could be used for transmitting power headroom-related information according to an alternative embodiment of the disclosure.

Sample control element formats that could be used in the second technique are shown in FIGS. 5a and 5b. In both cases, the control elements consist of byte-aligned octets, the length of the PH values is six bits, and reserved bits and/or padding bits can be used for byte alignment. In the wideband PH control element 500 of FIG. 5a, a one-bit indicator 510 is included at the beginning of the control element 500. One value for this indicator 510, for example "1", indicates that this control element 500 includes only a wideband PH. A padding bit 520 is then included, and then a PH value 530 that represents the power situation across the system bandwidth is included.

In the per-carrier PH control element 550 of FIG. 5b, the one-bit indicator 510 is again included at the beginning of the control element 550. The alternative value for this indicator 510, "0" in this example, indicates that this control element 550 includes PH values for all reporting carriers. A padding bit 520 is then included, followed by the PH values 560 for the reporting carriers in a manner similar to that depicted in FIG. 4. Additional padding bits 520 then fill out the last octet.

In another alternative, a UA transmits the PH value for one carrier and PH-related information for the remaining carriers at the same time. To reduce signaling overhead, one of two techniques could be used to transmit PH information for all reporting carriers.

In one technique under this alternative, a UA transmits the PH or the path loss of one reporting carrier. This carrier can be referred to as the reference carrier. For the remaining reporting carriers, the UA transmits a value representing a variation between the PH or path loss of the reference carrier and the PH or path loss of the remaining reporting carriers. That is, the UA reports the PH of the reference carrier and the relative difference between the PHs of the other carriers and the reference carrier's PH. Alternatively, the UA reports the path loss of the reference carrier and the relative difference between the path losses of the other carriers and the reference carrier's path loss, and the access node then calculates the PH based on the path loss information. The number of bits used to signal the relative differences is smaller than the number of bits used for signaling the absolute PH or absolute path loss value, thus reducing signaling overhead. The reference carrier could be the anchor carrier or the carrier transmitting the current PH report. If additional signaling information is included, the carrier having the highest (or lowest) PH could instead be the reference carrier.

In another technique under this alternative, a UA reports a single PH value and a bitmap, with the length of the bitmap equal to the number of carriers. If a particular carrier's bit within the bit map is one of two binary values (for example "1"), then that carrier's power headroom is greater than or equal to the reported PH value. If a particular carrier's bit within the bit map is the other of two binary values (for example "0"), then that carrier's power headroom is less than the reported PH value. This approach does not give an exact PH value for each carrier, but may provide sufficient information for scheduling purposes and results in fewer bits being required for power headroom reporting.

Under either of these techniques, the average PH value of all carriers could be transmitted instead of the specific PH value of one carrier. In this case, the remaining carriers will include all of the reporting carriers and the PH-related information to be transmitted will be the difference between this average PH value and the specific PH value of each of these carriers.

In the first technique of this alternative, a UA transmits the PH value for one carrier and transmits condensed PH-related information for the remaining carriers more frequently than the rate at which full absolute PH values are reported. More specifically, an absolute PHR containing PH information for all of the reporting carriers can be provided at certain periodic time intervals in order to ensure that the UA and access node are synchronized on this information. Between these absolute PHRs, the UA provides "incremental" PHRs that provide the absolute PH information for one carrier (for example, the anchor carrier or reference carrier) and relative incremental information for the remaining carriers (up to four additional carriers). This incremental information specifies how the path loss and power control correction of a carrier have changed relative to the anchor carrier's path loss. This allows the remaining carriers' PH values to be determined at the access node. The incremental information reporting is triggered by the criteria described above. In the case of incremental reporting, a different threshold from the threshold used for triggering an absolute PH could be configured.

There could be different ways of generating this incremental value. In one approach, the incremental value denoted by $\delta_k(i)$ is calculated from the path loss and power control correction difference between the anchor carrier and other carriers as follows.

$$C_A(i) = \alpha_A(j) \cdot PL_A(i) + f_A(i)$$

$$C_k(i) = \alpha_k(j) \cdot PL_k(i) + f_k(i)$$

$$\delta_k(i) = (C_k(i) - C_k(i-1)) - (C_A(i) - C_A(i-1))$$

where $\alpha_A(j)$, $PL_A(i)$, $f_A(i)$ are (respectively) the alpha value, path loss, and power control correction for the anchor carrier, and $\alpha_k(j)$, $PL_k(i)$, $f_k(i)$ are (respectively) the alpha value, path loss, and power control correction for the carrier which reports the incremental value. The i and n indices for indicating time instances are used interchangeably in the discussion of this technique.

The UA calculates this $\delta_k(i)$ value and transmits the value to the access node. The access node then uses this signaled value to determine the appropriate PH value for the non-anchor carriers. One approach for so doing is shown in the equation given below:

$$PH_k(n) = PH_k(n-1) + (10 \log_{10}(M_{PUSCH,k}(n-1)) + \Delta_{TF,k}(n-1)) - (10 \log_{10}(M_{PUSCH,k}(n)) + \Delta_{TF,k}(n)) + PH_A(n) + (10 \log_{10}(M_{PUSCH,A}(n)) + \Delta_{TF,A}(n)) - (PH_A(n-1) + (10 \log_{10}(M_{PUSCH,A}(n-1)) + \Delta_{TF,A}(n-1))) + \delta_k(n)$$

where the A subscript represents the anchor carrier, and the k subscript represents the kth carrier (where k covers all of the non-anchor reporting carriers). The $M_{PUSCH}$ and $\Delta_{TF}$ terms are added or subtracted as appropriate to compensate for the portion of the PH calculation that depends upon the corresponding transmission allocation (i.e., the number of allocated resource blocks and the transport block size). The n and n−1 indices on these quantities correspond to the transmission allocation parameters for the subframe where the PH was calculated. Due to Hybrid Automatic Repeat Request (HARQ) retransmissions of MAC Protocol Data Units (PDUs), this represents the subframe where the original HARQ transmission was made. This information could be stored at the access node. $\delta_k$ is a relative incremental adjustment described further below, which can be calculated as shown earlier.

It is recognized that the above equation is rather complicated and could be simplified by separating it into several different equations, such as shown in the example below.

$$P_A(n) = PH_A(n) + (10 \log_{10}(M_{PUSCH,A}(n)) + \Delta_{TF,A}(n))$$

$$P_k(n) = P_k(n-1) + (P_A(n) - P_A(n-1)) + \delta_k(n)$$

$$PH_k(n) = P_k(n) - (10 \log_{10}(M_{PUSCH,k}(n)) + \Delta_{TF,k}(n))$$

The P quantities in the above equations essentially track a combination of the path loss and power control correction for each of the carriers.

Figures 6, 7:
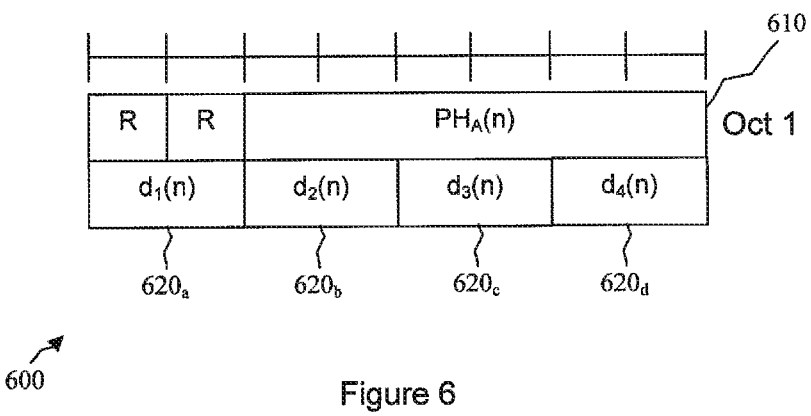
FIG. 6 is a diagram of a control element that could be used for transmitting power headroom-related information according to an alternative embodiment of the disclosure.
FIG. 7 is a table showing a mapping between a power difference and a two-bit variable according to an embodiment of the disclosure.

FIG. 6 shows an example format of such a Power Headroom MAC control element for the relative incremental reporting scheme. In this embodiment, the MAC control element 600 includes a PH value 610 for the anchor carrier. This value 610 is substantially similar to a PH value that would be transmitted under LTE for a single carrier. The MAC control element 600 also includes a plurality of fixed length payloads 620 of two bits. The payloads 620 are labeled in FIG. 6 as $d_k(n)$, where different values of k represent different carriers. If less than five carriers are in use, one or more $d_k(n)$ values are replaced by padding bits. Each $d_k(n)$ value is mapped to a $\delta_k(n)$ value, where $\delta_k(n)$ represents a relative incremental adjustment (in dB) or a value that is input to a function in order to determine the appropriate adjustment that should be made to the corresponding PH value currently being tracked at the access node for carrier k.

Values for $\delta_k(n)$ are indexed using the corresponding signaled $d_k(n)$ values. An example mapping of these quantities is shown in the table 700 of FIG. 7. Each possible value of the two-bit $d_k(n)$ payload 620 is mapped to a different value 710 for $\delta_k(n)$. In this example, the $\delta_k(n)$ values are −3 dB, −1 dB, +1 dB, and +3 dB, but in other embodiments other $\delta_k(n)$ values could be used. If one of the payloads 620 of the control element 600 has the value of "00", for example, the $\delta_k(n)$ value for the corresponding carrier is −3 dB, if one of the payloads 620 of the control element 600 has the value of "01", the $\delta_k(n)$ value for the corresponding carrier is −1 dB, and so on.

The example table 800 shown in FIG. 8 may be used to illustrate this method. Here, there are five carriers 810, including the reference carrier, and four other carriers (numbered from 1 to 4). The combined path loss and power control corrections for the previous reporting time (i.e., n−1) are shown in the second column 820, and the combined path loss and power control corrections for the current reporting time (i.e., n) are shown in the third column 830. As can be seen, the path loss has generally increased (e.g., perhaps the UA is now shadowed by a building), although by a different amount for each carrier. The fourth column 840 contains the delta change for each carrier from time n−1 to time n. This may be obtained by subtracting an entry in the second column 820 of the table 800 from the corresponding entry on the same row and in the third column 830. Finally, the fifth column 850 shows the delta value of each carrier relative to the reference carrier. These quantities may be obtained by subtracting the reference carrier's value in the fourth column 840 from each carrier's delta value in the fourth column 840. This essentially follows the equation defined above for $\delta_k(n)$. The values in this last column 850 may then be mapped to $d_k(n)$ for signaling purposes as shown in table 700 of FIG. 7. If a derived $\delta_k(n)$ value has not been mapped to a $d_k(n)$ value, a mapped $\delta_k(n)$ value that is close to the derived $\delta_k(n)$ value can be used. For example, for values where an exact match does not occur in table 700 (such as 0 dB for carrier 4), the closest $\delta_k(n)$ from table 700 is selected.

In yet another alternative for reporting LTE-A power headroom via a MAC control element, a UA transmits the PH of only a certain reporting carrier or of only certain reporting carriers. The disadvantage of transmitting the PH for all reporting carriers, as described in the first alternative given above, is that PH information may be reported unnecessarily. In an embodiment, to reduce signaling overhead, the UA transmits PH information only for a carrier or carriers for which a specific event trigger occurs or when that carrier's PUSCH is scheduled. Different dl-Pathloss-Change, periodicPHR-Timer, and/or prohibitPHR-Timer can be configured for each carrier or for a subset of carriers. In case where multiple events are triggered, PHs of all triggered carriers can be transmitted. For example, when the path loss difference is larger than a preconfigured threshold in carrier #1, UA would transmit the PH only for carrier #1. To indicate to the access node which reporting carriers' PHs are being transmitted, additional signaling, such as a bitmap, is included with a PH report. In some embodiments, if the allocated UL resources cannot accommodate the MAC control element of all PHs plus its subheader as a result of logical channel prioritization, then the UA can decide not to transmit all PHs or transmit PHs of a subset of carriers in the MAC control element to be accommodated in the allocated UL resources. The UA can select carriers based on the logical or physical carrier indexing. In one embodiment, the UA can select a carrier based on the priority of carrier. For example, the UA can transmit PH of the uplink anchor carrier or carrier transmitting the high QoS data.

An example of this technique is shown in FIG. 9, where a MAC control element 900 includes a bitmap 910 with a length equal to the number of reporting carriers. In this case, there are five reporting carriers, so the bitmap 910 includes five bits. The bit in the $k^{th}$ position indicates whether or not the PH value of the $k^{th}$ carrier is included in the control element 900. For example, "1" may mean that the corresponding PH value is included, while "0" may mean that the PH value is not included. In this example, the first, fourth, and fifth bits of the bitmap 910 are set to "1", so PH values for the first, fourth, and fifth carriers are included in the control element 900.

Alternatively, other reporting triggers could determine whether the PH of a reporting carrier is included in the control element 900. For example, an access node could specify that reporting carrier PHs are to be included only for the carrier having the highest PH or only for carriers having a PH larger than a specified threshold. In these cases, the number of carriers to include and/or the threshold can be predefined or configured by higher-layer signaling.

As another technique for transmitting PH values for a subset of the reporting carriers, the UA indicates the number of reported PH values and a corresponding carrier index for each of the carriers transmitting a PH value. The UA transmits a consolidated power headroom report (i.e., PH information for multiple carriers contained within a single MAC control element) on only one of the reporting carriers. This carrier can be labeled as the signaling carrier. The first PH value in a reported list of PH values can be automatically associated with the signaling carrier. Additional PH values in the list are then indexed using two-bit values to indicate which carrier they are associated with, with a pre-determined order being used to link index values with carriers (e.g., in ascending order of frequency).

An example of this technique is shown in FIG. 10. The first two bits 1010 of a MAC control element 1000 represent the total number of PH values included in the control element 1000, with the range of values that can be signaled being a function of the total number of aggregated carriers (e.g., a range of 2-5 when five carriers are aggregated, and a range of 1-4 when less than five carriers are aggregated). The remainder 1020 of the first octet includes the PH of the signaling carrier. Each subsequent octet includes a two-bit carrier index 1030 followed by a PH 1040 for the indexed carrier. The index 1030 indicates which of the other, non-signaling carriers has the PH value in the PH portion 1040 of the octet. For example, if there were four non-signaling carriers, a carrier index 1030 of "00" might refer to the first non-signaling carrier, a carrier index 1030 of "01" might refer to the second non-signaling carrier, and so on.

It should be noted that a combination of the above approaches can be used depending on the operation. For example, a UA might report PH values for all carriers periodically. Meanwhile, in the event-triggered case, the UA might report only for the selected carriers in order to reduce the signaling overhead.

In an embodiment, to support carrier aggregation, the calculation used to obtain PH in an LTE-based environment is modified to be carrier-specific in an LTE-A-based environment. An example of such a modified PH equation for calculating the PH value for LTE-A is given below.

$$PH_k(i) = P_{CMAX,k} - \{10 \log_{10}(M_{PUSCH,k}(i)) + P_{O\_PUSCH,k}(j) + \alpha_k(j) \cdot PL_k + \Delta_{TF,k}(i) + f_k(i)\}$$

where the definition of each parameter is given in 3GPP TS 36.213, but parameter values are different on a per-carrier basis. k denotes the kth carrier to be reported.

With the current LTE PH equation, scheduling information is needed to calculate PH. For example, the number of scheduled resource blocks ($M_{PUSCH,k}(i)$) needs to be known and the transport block size is needed in order to calculate $\Delta_{TF,k}(i)$. In an LTE-A-based environment with aggregated carriers, a UA may not have a current PUSCH allocation for a particular reporting carrier. Such a UA would not have the necessary scheduling information and therefore could not perform the PH calculation. In an embodiment, the UA makes certain assumptions in this situation in order to calculate and report PH values for any non-scheduled carriers. One of three different techniques might be used.

In one technique, the UA copies the resource configuration for a scheduled carrier. At least one carrier must be scheduled in order for the UA to be able to transmit a PH report. Any non-scheduled reporting carriers can use the same scheduling configuration (i.e., the number of resource blocks and the transport block size), as given for a selected scheduled carrier, in order to calculate a PH value. Possible methods for selecting a scheduled carrier whose scheduling configuration would be "copied" could be to select the nearest carrier as measured by carrier frequency or to select the scheduled carrier with the lowest or highest carrier frequency.

In another technique, the configuration of the Sounding Reference Signal (SRS) transmission is used. The SRS is transmitted periodically from the UA and is used by the access node to detect the UA channel situation. For frequency-selective scheduling, the access node configures the UA to transmit SRS in each carrier. The number of resource blocks of the SRS transmission is semi-statically configured and $\Delta_{TF,k}(i)$ is set to zero, so the UA is typically aware of these values. Since both the UA and access node know the SRS transmission parameters, the number of resource blocks of the SRS transmission can be used if a PUSCH transmission is not scheduled for a particular carrier.

In another technique, a reference configuration is predefined. Fixed reference values for the number of resource blocks and the transport block size can be predefined or configured by higher-layer signaling and then used in the calculation of a PH value for a non-scheduled carrier.

When the PUSCH and the PUCCH are configured for simultaneous transmission, the PUCCH-related PH may need to be transmitted to indicate that the transmit power used for the PUCCH-related PH can be the PH only for the PUCCH or can be a combined PUCCH and PUSCH PH. If the access node receives only the PUSCH PH, it may be difficult to exactly estimate the allowable PUSCH power when the PUSCH and PUCCH are transmitted simultaneously, because the sum of PUSCH and PUCCH power is limited not to exceed the maximum transmit power. In one embodiment, the UA transmits the PUCCH-related PH in a MAC control element when PH reporting is triggered and a PUSCH resource is scheduled. When the PUCCH is transmitted in the same subframe in which the PUSCH resource is allocated, the PUCCH-related PH is calculated by the UA based on the actual transmit power of the PUCCH. In one embodiment, the calculated PUCCH-related PH is inserted in the MAC control element and transmitted to the access node. However, it can happen that the PUCCH is not transmitted when the PUCCH-related PH is reported, because PUCCH transmission is independent of PUSCH transmission. In this case, the UA cannot calculate the PH because the PUCCH transmit power is not defined when the PUCCH is not transmitted. One solution is to assume a reference configuration among different PUCCH formats when the UA transmits the PUCCH-related PH and the PUCCH is not transmitted. This reference configuration can be predefined in the specification or configured by higher layer signaling. The higher layer signaling could be UA-specific signaling or broadcast signaling. For example, the reference configuration could be one of the PUCCH formats from 3rd Generation Partnership Project (3GPP) Technical Specification (TS) 36.211, herein incorporated by reference. For example, the reference configuration could be PUCCH format 1A from TS 36.211. In some embodiments, the PUCCH format requiring the most transmission power is used as the reference configuration. When using a reference configuration, the UA estimates the transmission power needed to transmit the PUCCH assuming it were to transmit the PUCCH using the reference configuration. It then uses this estimated transmission power to calculate the PUCCH-related PH.

For example, the following equation may be used in the two cases discussed, with the second equation using PUCCH format 1$a$ as the reference configuration:

$$PH(i) = \begin{cases} P_{CMAX} - \{P_{0\_PUCCH} + PL + h(n_{CQI}, n_{HARQ}) + \Delta_{F\_PUCCH}(F) + g(i)\} & \text{if PUCCH is transmitted} \\ P_{CMAX} - \{P_{0\_PUCCH} + PL + g(i)\} & \text{otherwise} \end{cases}$$

In the previous equation, it is assumed that PH is reported only for the PUCCH. For the combined PUCCH and PUSCH PH case, the following equation can be used:

$$PH(i) = \begin{cases} \begin{pmatrix} P_{CMAX} - \{P_{0\_PUCCH} + PL + h(n_{CQI}, n_{HARQ}) + \\ \Delta_{F\_PUCCH}(F) + g(i) - \\ \{10\log_{10}(M_{PUSCH}(i)) + P_{O\_PUSCH}(j) + \\ \alpha(j) \cdot PL + \Delta_{TF}(i) + f(i)\} \end{pmatrix} & \text{if PUCCH is transmitted} \\ \begin{pmatrix} P_{CMAX} - \{P_{0\_PUCCH} + PL + g(i)\} - \\ \{10\log_{10}(M_{PUSCH}(i)) + P_{O\_PUSCH}(j) + \\ \alpha(j) \cdot PL + \Delta_{TF}(i) + f(i)\} \end{pmatrix} & \text{otherwise} \end{cases}$$

In another embodiment, the UA assumes the fixed value for the parameters which are variable depending on the transmitted PUCCH transmission. According to the equation to set the PUSCH transmission power described in 3GPP TS 36.213, $h(n_{CQI}, n_{HARQ})$ and $\Delta_{F\_PUCCH}(F)$ are different for different PUCCH formats. When the PUCCH is not transmitted, the UA uses reference values for these parameters, where the reference value can be predefined in the specification or configured by higher layer signaling. For example, if the UA assumes both $h(n_{CQI}, n_{HARQ})$ and $\Delta_{F\_PUCCH}(F)$ as 0, the above equation can be used. Other non-zero values can also be used.

Figure 11:
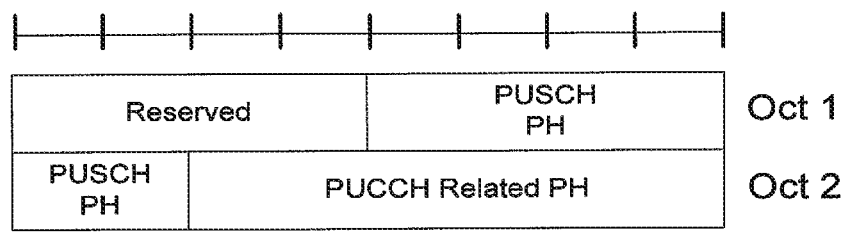
FIG. 11 illustrates an exemplary MAC control element according to an embodiment of the disclosure.

FIG. 11 illustrates an exemplary MAC control element wherein the PUSCH PH and PUCCH-related PH are transmitted in a single MAC control element. In FIG. 11, four reserved bits are included in octet 1, six bits are used to represent the PUSCH PH and six bits are used to represent the PUCCH-related PH.

In some embodiments, one MAC control element is used to represent the PUSCH PH and another MAC control element is used to represent the PUCCH-related PH. In some embodiments, if the allocated UL resources cannot accommodate the combined MAC control element (PUCCH-related PH+PUSCH PH) plus its subheader as a result of logical channel prioritization, then the UA only transmits one MAC control element containing the PUSCH PH.

In some embodiments, the access node configures whether PUCCH-related PH reporting should be performed using broadcast signaling or dedicated (UA-specific) signaling. For example, the access node can configure some UAs to report PUCCH-related PH and PUSCH PH. These two reports can be transmitted from the UA using a single MAC control element. The access node can configure other UAs to report only PUSCH PH. This one report can be transmitted from the UA using a single MAC control element. The configuration can be based on UA capability, scheduling algorithms, etc.

Combinations of the above embodiments can also be used. For example, a UA may be configured to report PUSCH PH for one or multiple carriers and PUCCH-related PH for one or multiple carriers. One or multiple MAC control elements can be used to report the required PH information.

As mentioned above, one of the factors included in the calculation of power headroom is the downlink path loss. When multiple downlink component carriers are aggregated, it may not be clear which of the downlink component carriers is to be used for deriving path loss and thus for deriving the power headroom. For example, it may not be desirable to calculate path loss on a downlink component carrier that has been deactivated. In an embodiment, two alternatives are provided for determining which downlink component carrier is to be used for deriving path loss. In one alternative, the determination of which downlink component carrier is to be used for path loss derivation is based on a downlink component carrier that is linked to an uplink component carrier in the broadcast system information. In another alternative, the determination of which downlink component carrier is to be used for path loss derivation is based on a downlink component carrier that that has been designated for path loss derivation.

Details of how to derive the path loss (PL) value in a carrier aggregation scenario are now provided. The PL value is required to calculate the PH value at uplink carriers as shown in the following equation.

$$PH_k(i) = P_{CMAX,k} - \{10 \log_{10}(M_{PUSCH,k}(i)) + P_{O\_PUSCH,k}(j) + \alpha_k(j) \cdot PL_k + \Delta_{TF,k}(i) + f_k(i)\}$$

PL is the downlink path loss estimate derived by the UA, and PL=referenceSignalPower−higher layer filtered RSRP (Reference Signal Received Power), where referenceSignalPower is provided by higher layers and RSRP is measured in the UA and filtered with the higher layer filter configuration defined by higher layers.

Since only one DL Component Carrier (CC) and one UL CC are supported in Release-8, it is preferable that PL be derived from the DL CC on which the UA measures RSRP. In carrier aggregation, however, a UA can be configured to receive multiple DL CCs, and it may be possible to refer to any DL CC for path loss derivation, although there is a cell-specific linkage between DL CC and UL CC for idle mode UAs, and this linkage is typically signaled in the system information. Therefore, it may be helpful to define which of the multiple DL CCs should be used for PL derivation.

There are two aspects to be considered when defining the UA operation to determine the DL CC to be used for PL derivation. In the first aspect, the DL CC may not always be activated. In carrier aggregation, multiple DL CCs may be configured for a UA supporting carrier aggregation. These configured DL CCs can be activated or deactivated via MAC signaling. Actual downlink data is scheduled only to the activated DL CCs. This means that the UA may not need to receive PDCCH or PDSCH on the deactivated DL CCs. In this case, to save UA battery power, the UA could stop receiving all DL transmissions on the deactivated DL CCs. If the UA is implemented in this way, it would also be desirable not to derive PL on a deactivated CC even though that DL CC has been designated for PL derivation (especially if RSRP measurement on a deactivated CC consumes UA processing power). One exception would be that the UA could measure RSRP on a deactivated CC if this measurement is explicitly configured by higher layer signaling.

In the second aspect, a different DL CC can be used other than the linked DL CC for PL derivation. To compensate for the difference between the PL derived with a different DL CC and the actual PL for PH calculation of a UL CC, an offset value can be signaled by the access node. The access node could generate this offset based on measurement reporting or a statistical model or field testing. However, the PL may not be correct in the actual environment, especially if the DL CC being referenced is located in a different frequency band from the UL CC and the UA is moving.

To clarify the description of the proposed UA operation for PL derivation, the following carrier types are introduced. One type can be referred to as the Downlink Primary Component Carrier (DL PCC). In this case, one of the DL CCs is configured as the DL PCC, and the DL PCC is never deactivated. Another type can be referred to as the Paired DL CC. This is a DL CC cell specifically linked to a UL CC in the broadcast system information. Another type can be referred to as the DL CC_pl. This is a DL CC used for PL derivation. Each UL CC could be configured to reference one DL CC_pl for PL derivation. With these definitions in place, two alternatives can be provided.

In the first alternative, the UA uses the paired DL CC for PL derivation if that paired DL CC is activated or configured for measurement. Since the paired DL CC for each UL CC is signaled in the system information, additional signaling to indicate DL CC_pl would not be required. When the paired DL CC is deactivated and has not been configured for measurement, and the UL CC still needs to be transmitted, there are three possible approaches. In a first approach, the UA may still derive PL from the (deactivated) paired DL CC. In this case, the UA still measures RSRP on the paired DL CC. In a second approach, the UA may derive PL from another DL CC in the same band where the other DL CC is activated or where measurement has been configured. In a third approach, the UA derives PL from another DL CC provided by the access node. The reference carrier may be implicit, such as the DL PCC. The offset between DL CCs and PCC may need to be signaled. Since PL difference is likely to happen when PCC and DL CC are in different bands, the offset can be signaled if the corresponding DL CC is in a different band than PCC. Alternatively, the offset between frequency bands can be signaled.

One of these approaches can be selected or all three approaches can be defined. When all approaches can be applicable, it may be preferable to prioritize using the first or second approach, considering the accuracy of PL derivation. In other words, if the paired DL CC is not activated and not configured for measurement, the UA may still derive PL from the paired DL CC or may derive PL from another DL CC in the same band where the DL CC is either activated or measurement is configured. Otherwise, the UA might use the offset (and the reference DL CC where the offset should be applied) provided by the access node.

In a second alternative, the access node can configure the UA to reference any DL CC for DL CC_pl. An offset may not be needed if the PL of DL CC_pl and the actual PL required for the UL CC are similar. This might happen if they are located in the same frequency band. Otherwise, the offset could be signaled. Two different UA operations might be used depending on whether the DL CC_pl is in the same frequency band as the UL CC or not. In the case where DL CC_pl is in the same frequency band as the UL CC, the UA could use the DL CC_pl for PL derivation if that DL CC_pl is activated or configured for measurement. When DL CC_pl is deactivated but the UL CC still needs to be transmitted, the UA could apply the same approaches as described with regard to the first alternative. In the case where DL CC_pl is in a different frequency band, the UA may use another DL CC, e.g., the paired DL CC or DL CC in the same frequency band with the UL CC if this DL CC is activated or configured for measurement. Otherwise, the UA could derive the PL with DL CC_pl and an offset. This is because the PL derived by the paired DL CC or DL CC in the same frequency band might be more accurate than the PL derived by the DL CC_pl with an offset. The same PL derivation method could be applied to the uplink transmit power setting for uplink channels, e.g., PUSCH or PUCCH, as well as the PH value calculation in each UL CC.

Figure 12:
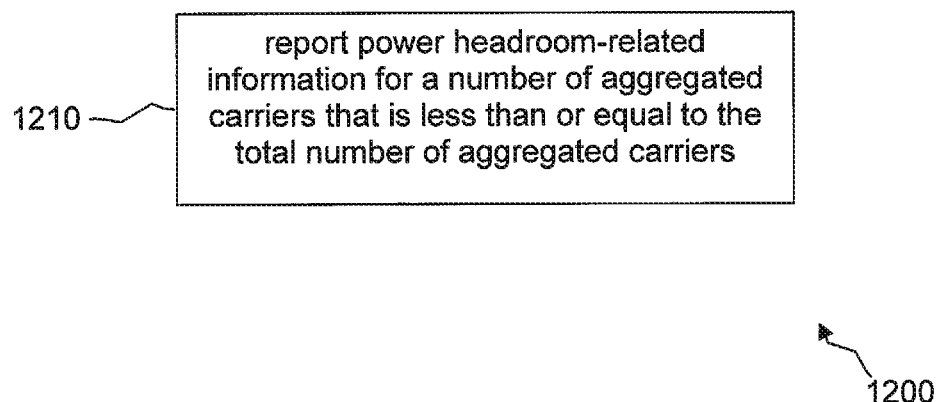
FIG. 12 is a diagram illustrating a method for reporting power headroom-related information for a plurality of aggregated carriers according to an embodiment of the disclosure.

FIG. 12 illustrates an embodiment of a method 1200 for reporting power headroom-related information for a plurality of aggregated carriers. At block 1210, power headroom-related information is reported for a number of the aggregated carriers that is less than or equal to the total number of aggregated carriers.

Figure 13:
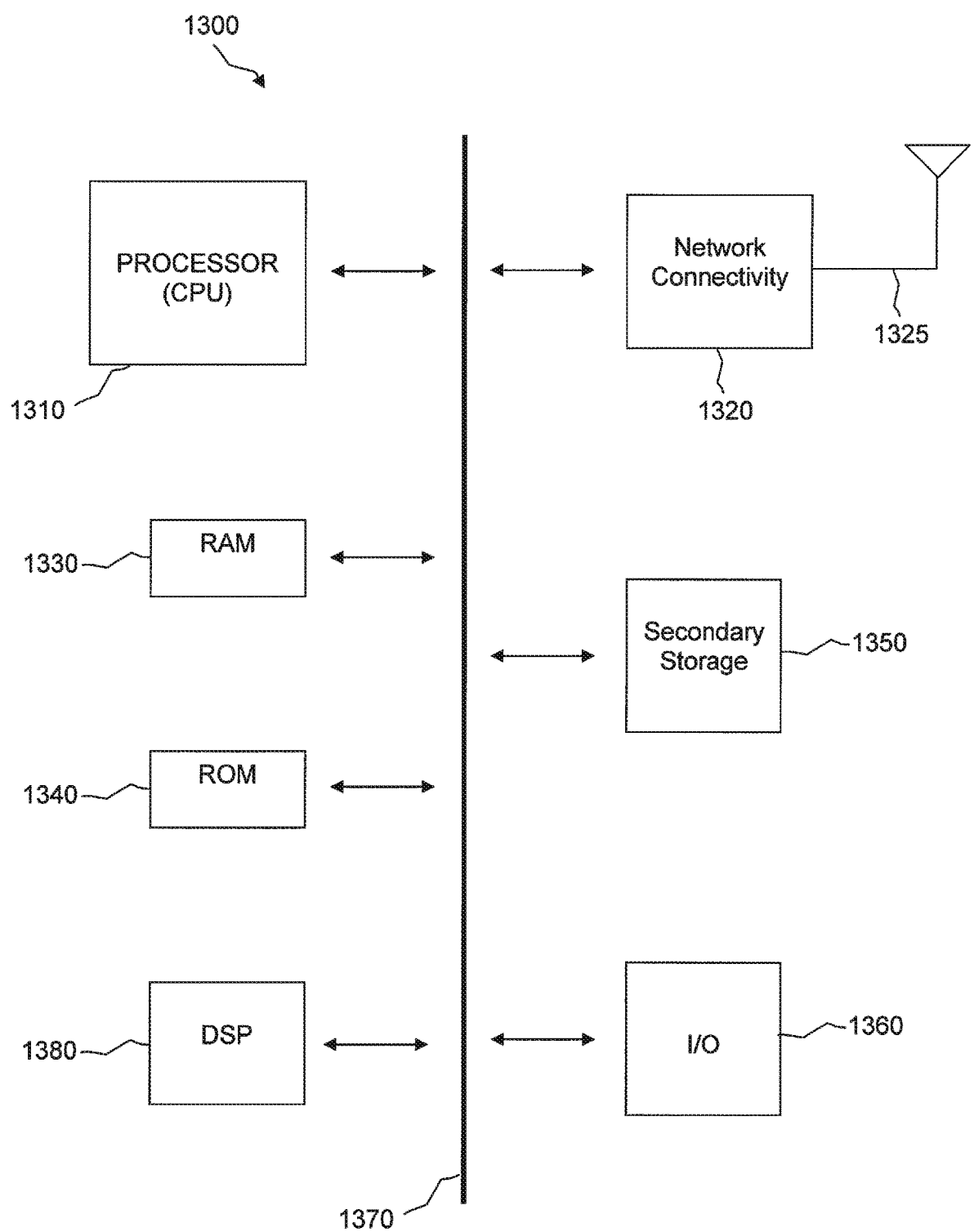
FIG. 13 illustrates a processor and related components suitable for implementing the several embodiments of the present disclosure.

The UA 210, the access node 220, and other components described above might include a processing component that is capable of executing instructions related to the actions described above. FIG. 13 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for reporting power headroom-related information for a plurality of aggregated carriers. The method includes reporting in a bitmap the power headroom-related information for a number of the aggregated carriers that is less than or equal to the total number of aggregated carriers, wherein the power headroom-related information is one of a power headroom for at least one of the aggregated carriers and a path loss for at least one of the aggregated carriers.

In another embodiment, a user agent is provided. The user agent includes a component configured such that the user agent transmits in a bitmap power headroom-related information for a number of aggregated carriers that is less than or equal to the total number of aggregated carriers in a plurality of aggregated carriers, wherein the power headroom-related information is one of a power headroom for at least one of the aggregated carriers and a path loss for at least one of the aggregated carriers.

In another embodiment, an access node in a wireless telecommunications system is provided. The access node includes a component configured such that the access node receives in a bitmap power headroom-related information for a number of aggregated carriers that is less than or equal to the total number of aggregated carriers in a plurality of aggregated carriers, wherein the power headroom-related information is one of a power headroom for at least one of the aggregated carriers and a path loss for at least one of the aggregated carriers.

In another embodiment, a method is provided for reporting power headroom-related information for a plurality of aggregated carriers. The method comprises reporting the power headroom-related information for a number of the aggregated carriers that is less than or equal to the total number of aggregated carriers, wherein the power headroom-related information is one of a power headroom for at least one of the aggregated carriers and a path loss for at least one of the aggregated carriers. The method or portions of the method may be carried out by a UA and/or an access node.

In another embodiment, a method is provided for reporting power headroom for a plurality of aggregated carriers. The method comprises transmitting a power headroom value that is one of a power headroom for a reference carrier in the aggregation of carriers and a function of power headroom values for the aggregation of carriers. The method further comprises, for each of the remaining carriers in the aggregation of carriers, reporting a variation of the power headroom from the transmitted power headroom value. The method or portions of the method may be carried out by a UA and/or an access node.

In another embodiment, a method is provided for determining which carrier among a plurality of aggregated carriers is to be used for derivation of a path loss. The method comprises basing the determination on at least one of a downlink component carrier that is linked to an uplink component carrier in broadcast system information and a downlink component carrier that has been designated for path loss derivation. The method or portions of the method may be carried out by a UA and/or an access node.

The following are incorporated herein by reference for all purposes: 3rd Generation Partnership Project (3GPP) Technical Specification (TS) 36.211, 3GPP TS 36.213, 3GPP TS 36.321, and 3GPP Technical Report (TR) 25.942.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a user agent (UA) comprising a processor and a memory device storing instructions executable by the processor to implement the method, the method comprising:
    transmitting, in a media access control (MAC) control element from the UA to an access node, power headroom-related information for a number of aggregated carriers, the number of aggregated carriers comprising a plurality of aggregated carriers that is less than or equal to a total number of the aggregated carriers, the number of aggregated carriers comprising at least a first carrier and a second carrier,
    wherein the MAC control element includes a bitmap, the bitmap having a first bit with a first value indicating that the MAC control element includes a first power headroom value for the first carrier and a second bit with a second value indicating that the MAC control element does not include a second power headroom value for the second carrier.

2. The method of claim 1, wherein the transmission of the power headroom-related information is triggered when the UA receives a new carrier configuration from the access node and/or a new power headroom (PH) reporting configuration that includes a new reporting carrier.

3. The method of claim 1, wherein, when an observed path loss difference for a reporting carrier among the aggregated carriers exceeds a pre-defined amount since a previous power headroom report, the UA transmits power headroom information for all reporting carriers in the bitmap.

4. The method of claim 1, wherein the transmission of the power headroom-related information is triggered by one of:
    a change in an observed path loss of a reporting carrier among the aggregated carriers being greater than a pre-defined amount since a previous power headroom report;
    addition of a third carrier to the aggregated carriers;
    expiration of a timer that controls periodic power headroom reports; or
    when a new carrier is removed from the aggregated carriers.

5. A user agent (UA) comprising a memory device and a processor configured to execute instructions stored on the memory device such that when executed, cause the UA to:
    transmit, via a transmitter on the UA, power headroom-related information for a number of aggregated carriers, the number of aggregated carriers comprising a plurality of aggregated carriers that is less than or equal to a total number of the aggregated carriers, the number of aggregated carriers comprising at least a first carrier and a second carrier,
    wherein the UA transmits, to an access node, the power headroom-related information in a media access control (MAC) control element, wherein the MAC control element includes a bitmap having a first bit with a first value indicating that the MAC control element includes a first power headroom value for the first carrier and a second bit with a second value indicating that the MAC control element does not include a second power headroom value for the second carrier.

6. The UA of claim 5, wherein the transmission of the power headroom-related information is triggered when the UA receives a new carrier configuration from the access node and/or a new power headroom (PH) reporting configuration that includes a new reporting carrier.

7. The UA of claim 5, wherein, when an observed path loss difference for a reporting carrier among the aggregated carriers exceeds a pre-defined amount since a previous power headroom report, the UA transmits a new bitmap comprising a consolidated power headroom report (PHR) with power headroom information for all reporting carriers, wherein the new bitmap comprises a number of bits equal to a total number of all the reporting carriers.

8. The UA of claim 5, wherein the transmission of the power headroom-related information is triggered by one of:
    a change in an observed path loss of a reporting carrier among the aggregated carriers being greater than a pre-defined amount since a previous power headroom report;
    addition of a third carrier to the aggregated carriers;
    expiration of a timer that controls periodic power headroom reports; or
    when a new carrier is removed from the aggregated carriers.

9. A non-transitory computer medium storing computer readable instructions executable by a processor to implement a method, the method comprising:
    transmitting, in a media access control (MAC) control element from a user agent (UA) to an access node, power headroom-related information for a number of aggregated carriers, the number of aggregated carriers comprising a plurality of aggregated carriers that is less than or equal to a total number of the aggregated carriers, the number of aggregated carriers comprising at least a first carrier and a second carrier,
    wherein the MAC control element includes a bitmap, the bitmap having a first bit with a first value indicating that the MAC control element includes a first power headroom value for the first carrier and a second bit with a second value indicating that the MAC control element does not include a second power headroom value for the second carrier.

10. The non-transitory computer medium of claim 9, wherein the transmission of the power headroom-related information is triggered when the UA receives a new carrier configuration from the access node and/or a new power headroom (PH) reporting configuration that includes a new reporting carrier, and wherein the bitmap comprises a number of bits equal to the number of aggregated carriers for which the power headroom-related information is transmitted.

11. The non-transitory computer medium of claim 9, wherein, when an observed path loss difference for a reporting carrier among the aggregated carriers exceeds a pre-defined amount since a previous power headroom report, the UA transmits a consolidated power headroom report (PHR) for all reporting carriers to the access node.

12. The non-transitory computer medium of claim 9, wherein the transmission of the power headroom-related information is triggered by one of:
  a change in an observed path loss of a reporting carrier among the aggregated carriers being greater than a pre-defined amount since a previous power headroom report;
  addition of a third carrier to the aggregated carriers;
  expiration of a timer that controls periodic power headroom reports; or
  when a new carrier is removed from the aggregated carriers.

13. A method implemented in an access node comprising a processor and a memory device storing instructions executable by the processor to implement the method, the method comprising:
  receiving, in a media access control (MAC) control element transmitted by a user agent, power headroom-related information for a number of aggregated carriers, the number of aggregated carriers comprising a plurality of aggregated carriers that is less than or equal to a total number of the aggregated carriers, the number of aggregated carriers comprising at least a first carrier and a second carrier,
  wherein the MAC control element includes a bitmap, the bitmap having a first bit with a first value indicating that the MAC control element includes a first power headroom value for the first carrier and a second bit with a second value indicating that the MAC control element does not include a second power headroom value for the second carrier.

14. The method of claim 13, wherein the transmission of the power headroom-related information is triggered when the access node sends a new carrier configuration to the user agent and/or a new power headroom (PH) reporting configuration that includes a new reporting carrier.

15. The method of claim 13, wherein, when an observed path loss difference for a reporting carrier among the aggregated carriers exceeds a pre-defined amount since a previous power headroom report, the access node is configured to receive, from the user agent, a consolidated power headroom report (PHR) comprising power headroom information for all reporting carriers.

16. The method of claim 13, wherein the transmission of the power headroom-related information is triggered by one of:
  a change in an observed path loss of a reporting carrier among the aggregated carriers being greater than a pre-defined amount since a previous power headroom report;
  addition of a third carrier to the aggregated carriers;
  expiration of a timer that controls periodic power headroom reports; or
  when a new carrier is removed from the aggregated carriers.

17. An access node comprising a memory device and a processor configured to execute instructions stored on the memory device such that when executed, cause the access node to:
  receive, via a receiver on the access node, power headroom-related information for a number of aggregated carriers, the number of aggregated carriers comprising a plurality of aggregated carriers that is less than or equal to a total number of the aggregated carriers, the number of aggregated carriers comprising at least a first carrier and a second carrier,
  wherein the access node receives the power headroom-related information in a media access control (MAC) control element transmitted by a user agent, wherein the MAC control element includes a bitmap having a first bit with a first value indicating that the MAC control element includes a first power headroom value for the first carrier and a second bit with a second value indicating that the MAC control element does not include a second power headroom value for the second carrier.

18. The access node of claim 17, wherein the transmission of the power headroom-related information is triggered when the access node sends a new carrier configuration to the user agent and/or a new power headroom (PH) reporting configuration that includes a new reporting carrier.

19. The access node of claim 17, wherein, when an observed path loss difference for a reporting carrier among the aggregated carriers exceeds a pre-defined amount since a previous power headroom report, the access node is configured to receive, from the user agent, a new bitmap comprising power headroom information for all reporting carriers, each of the reporting carriers corresponding to a bit in the new bitmap.

20. The access node of claim 17, wherein the transmission of the power headroom-related information is triggered by one of:
  a change in an observed path loss of a reporting carrier among the aggregated carriers being greater than a pre-defined amount since a previous power headroom report;
  addition of a third carrier to the aggregated carriers;
  expiration of a timer that controls periodic power headroom reports; or
  when a new carrier is removed from the aggregated carriers.

* * * * *